United States Patent [19]
Wu

[11] Patent Number: 5,760,765
[45] Date of Patent: Jun. 2, 1998

[54] MOUSE STRUCTURE

[75] Inventor: Arthur Wu, Taipei Hsien, Taiwan

[73] Assignee: Primax Electronics Ltd., Hsien, Taiwan

[21] Appl. No.: 635,461

[22] Filed: Apr. 22, 1996

[51] Int. Cl.⁶ .................................................. G09G 5/08
[52] U.S. Cl. ........................................ 345/165; 345/163
[58] Field of Search ................................. 345/165, 166, 345/163, 164, 167, 169, 156, 157; 74/471 XY; 341/22, 21

[56] References Cited

U.S. PATENT DOCUMENTS

| | | | |
|---|---|---|---|
| 4,464,652 | 8/1984 | Lapson et al. | 345/146 |
| 4,818,978 | 4/1989 | Kurihara et al. | 345/165 |
| 5,298,916 | 3/1994 | Sato | 345/167 |
| 5,457,479 | 10/1995 | Cheng | 345/163 |
| 5,565,890 | 10/1996 | Wu et al. | 345/167 |

*Primary Examiner*—Xiao Wu
*Attorney, Agent, or Firm*—Laff, Whitesel, Conte & Saret, Ltd.

[57] ABSTRACT

A mouse structure is provided. The mouse structure includes a shell adapted to receive therein a ball, a receiving device for receiving a photo interrupting device in the shell, and an urging device for urging the photo interrupting device to contact against the ball properly. The probability of shift-detection missing is then reduced.

12 Claims, 3 Drawing Sheets

MOUSE STRUCTURE

FIELD OF THEE INVENTION

The present invention relates to a mouse structure, and more particularly relates to a mouse structure capable of reducing the probability of signal-detection missing.

BACKGROUND OF THE INVENTION

Mouse is one of the important input devices for controlling the movement of a cursor on a computer monitor. A mouse generally includes a ball, an X-axial grid wheel and a Y-axial grid wheel. An LED and a photo-transistor are disposed on different sides of each of the grid wheels. While operated, X- and Y-axial grid wheels rotate accompanying the rolling of the ball. The light from the LED is emitted to the photo-transistor intermittently through the apertures of the grid wheels for generating control signals for the movement of a cursor on a computer monitor. Accordingly, if the rotation of X- or Y-direction or both grid wheels cannot match with the rolling of the ball, there will be a signal-detection missing occurring upon controlling the movement of the cursor.

The conventional mouse structure has a spring located in the Z-axial direction, and the X-axial and Y-axial grid wheels are fixed. The ball is urged by the spring to contact the shafts of the X- and Y-axial grid wheels, respectively. Thus, when the ball rolls, the frictional forces between the ball and each of the shafts drive the rotation of the respective grid wheels simultaneously.

Unfortunately, in some special operations, the ball may lost contact with the shafts of the X- and Y-axial grid wheels because of the fixedly located grid wheel structure. For example, some operations such as drawing a circle rapidly around a certain point may cause an elevatory movement of the mouse in the Z-axial direction, so that an inertial force of the ball will balance against the elastic force generated by the spring and cause the ball to lose contact with the shafts of the fixedly located X-axial and Y-axial grid wheels, thus causing a shift-detection missing for the cursor.

Furthermore, because the ball is urged by the spring in the Z-direction toward and in contact with the shafts of X-axial and Y-axial grid wheels, the elastic force generated by the spring is highly correlatives to the material of the ball. If a relatively light ball is used, the accuracy of the elastic force of the spring must be controlled very carefully within a limited range, which brings about much trouble in manufacturing and purchasing the springs.

For the reason described above, the conventional mouse usually uses a relatively heavy ball. Although a heavy ball can bear a relatively large allowance error of the elastic force, a spring generating stronger elastic force is needed to properly urge the heavy ball against the shafts of the grid wheels. Furthermore, a user has to spend much more power in operating the mouse with a heavy ball. In addition, the large elastic force required for urging the heavy ball damage the spring more easily.

SUMMARY OF THE INVENTION

An object of the present invention is to provide a mouse structure by which the probability of signal-detection missing can be reduced.

The mouse structure utilizes two coaxial torsional springs to urge the shafts of an X-axial grid wheel and a Y-axial grid wheel to contact the surface of a ball of the mouse properly.

Another object of the present invention is to provide a mouse structure capable of using a relatively light ball with a spring generating elastic force of limited accuracy.

According to one aspect of the present invention, a mouse structure is provided, which includes a shell adapted to receive therein a ball, a receiving means for receiving a photo interrupting device in the shell, and an urging means urging the photo interrupting device to contact against said ball.

In accordance with one aspect of the present invention, the photo interrupting device preferably includes an X-axial grid wheel and a Y-axial grid wheel, and the receiving means includes an X-axial receiving means mounted on the shell for receiving a shaft of the X-axial grid wheel, and a Y-axial receiving means mounted on the shell for receiving a shaft of the Y-axial grid wheel.

The urging means preferably includes a first prop extending upward from a bottom of the shell, a second prop extending upward from the bottom of the shell, a first torsional spring coaxially sleeved on the first prop and having a first end for urging against the shaft of the X-axial grid wheel, and a second end for contacting against the second prop, and a second torsional spring coaxially sleeved on the first prop and having a first end for urging against the shaft of the Y-axial grid wheel, and a second end for contacting against the second prop.

In another aspect of the present invention, the mouse structure preferably further includes a Z-axial fixing means mounted in the shell. In still another aspect of the present invention, the mouse structure preferably further includes a ball mask mounted among the X-axial receiving means, the Y-axial receiving means and the Z-axial fixing means for receiving the ball therein.

In one aspect of the present invention, the X-axial receiving means preferably includes a first X-axial fastener having a hole for receiving a first end of the shaft of the X-axial grid wheel, and a second X-axial fastener having a slot for receiving a second end of the shaft of the X-axial grid wheel, wherein the second end is movable in the slot. The Y-axial receiving means preferably includes a first Y-axial fastener having a hole for receiving a first end of the shaft of the Y-axial grid wheel, and a second Y-axial fastener having a slot for receiving a second end of the shaft of the Y-axial grid wheel, wherein the second end of the shaft is movable in the slot of the second X-axial fastener.

The first X-axial fastener, the first Y-axial fastener and the Z-axial fixing means are preferably integrally formed with the ball mask.

The first X-axial fastener, the first Y-axial fastener, the Z-axial fixing means and the ball mask are preferably integrally formed with the shell.

The second X-axial fastener is preferably integrally formed with the shell.

The second Y-axial fastener is preferably integrally formed with the shell.

In another aspect of the present invention, the first prop is preferably integrally formed with the shell.

The present invention may best be understood through the following description with reference to the accompanying drawings, in which:

DETAILED DESCRIPTION OF THE PREFERRED EMBODIMENTS

Figure 1:
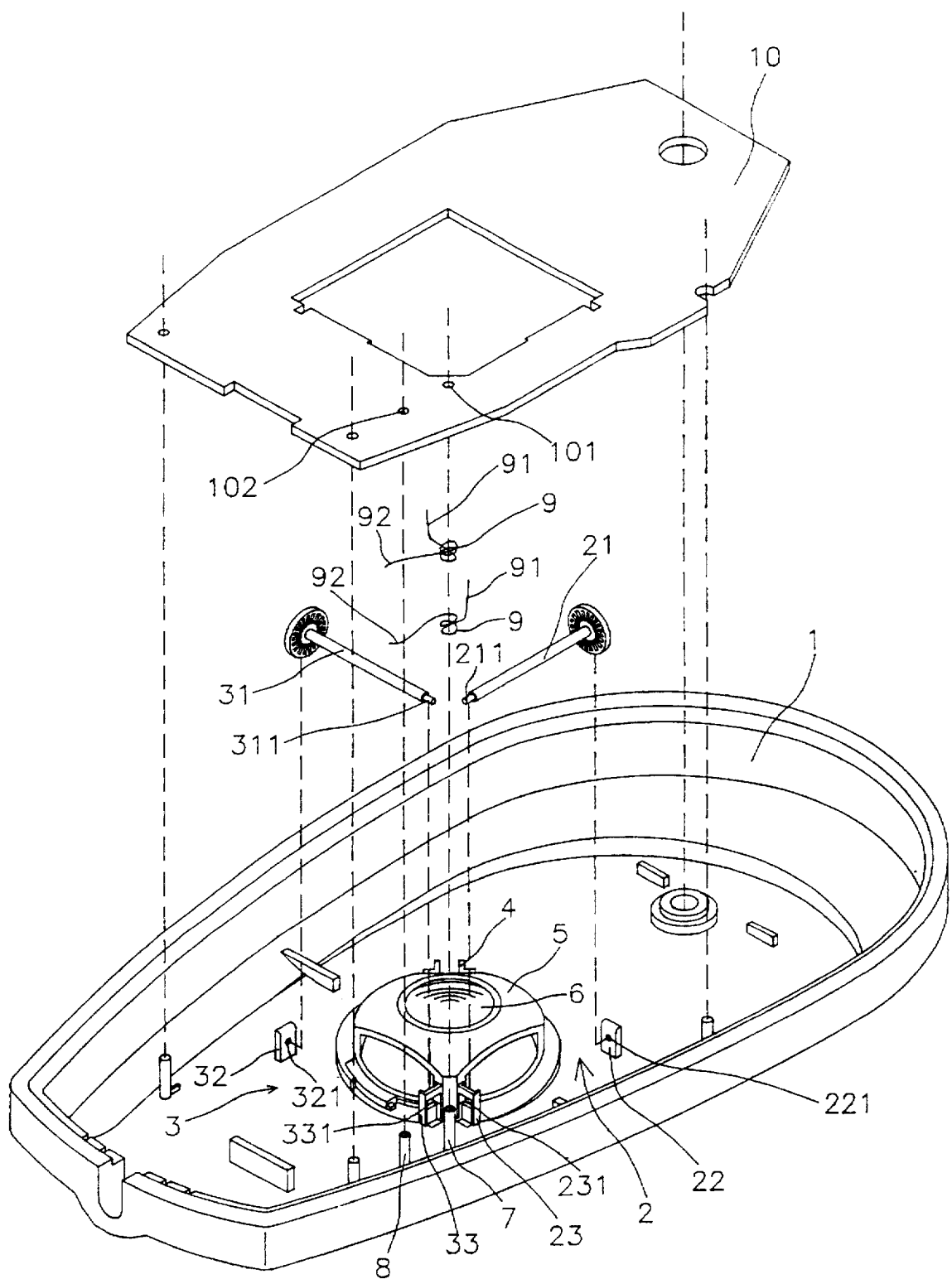
FIG. 1 is an exploded view of a preferred embodiment of a mouse structure according to the present invention.
Figure 2:
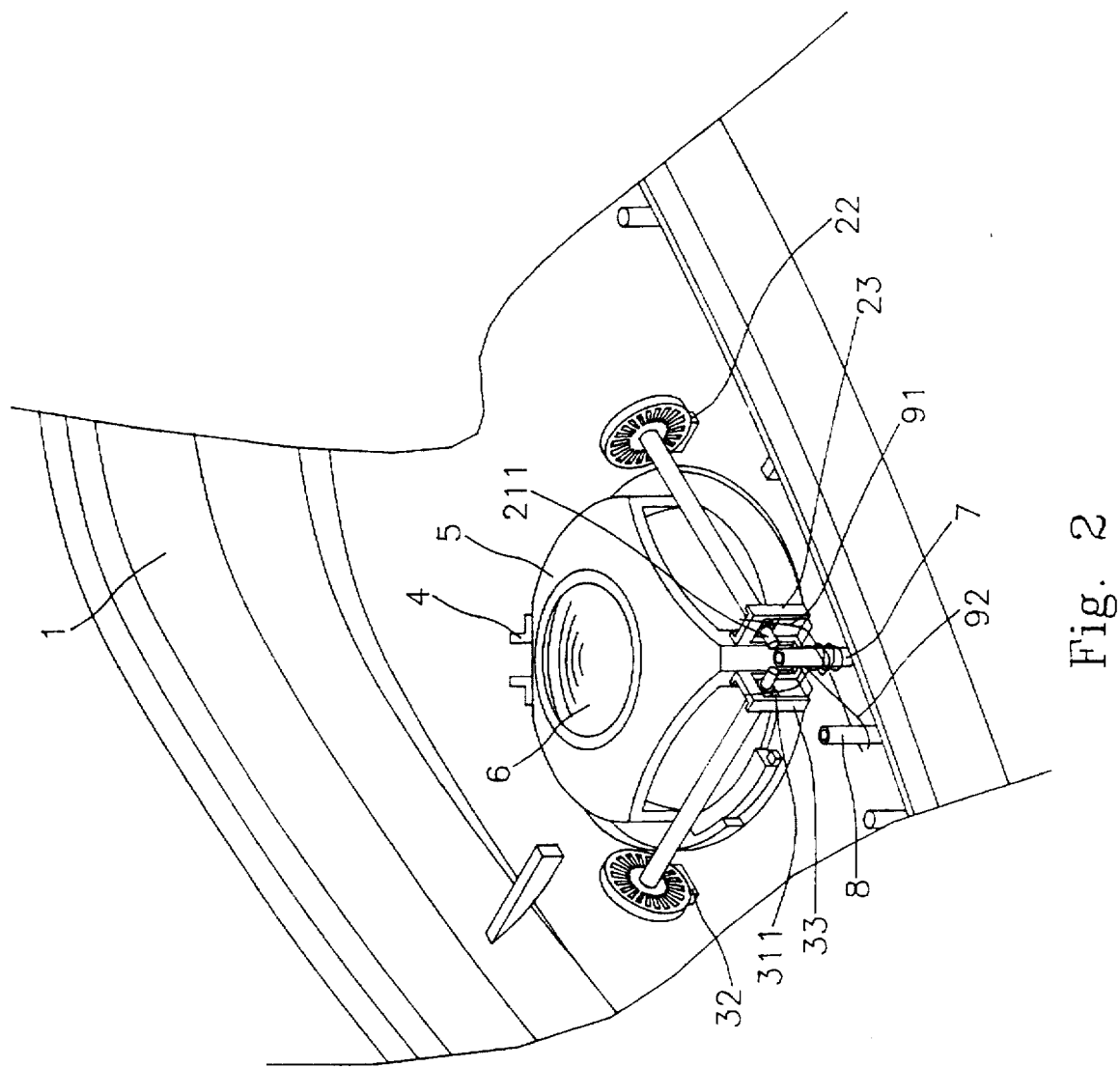
FIG. 2 is a partially enlarged view of the assembled mouse structure of FIG. 1.

Referring to FIGS. 1 and 2, there is shown a mouse structure having a shell 1, an X-axial receiving means 2 in shell 1 for receiving a shaft 21 of an X-axial grid wheel, a Y-axial receiving means 3 in shell 1 for receiving a shaft 31 of a Y-axial grid wheel, a Z-axial fixing means 4 in shell 1 for fixing a roller (not shown in figures), a ball mask 5 mounted among the X-axial receiving means 2, the Y-axial receiving means 3 and the Z-axial fixing means 4 for receiving a ball 6 therein, a first prop 7 extending upward from the bottom of the shell 1, a second prop 8 extending upward from the bottom of the shell 1, and two torsional springs 9 coaxially sleeving around the first prop 7. Each of the torsional springs 9 has a first end 91 and a second end 92, wherein the first end 91 of one of the torsional springs 9 urges against the shaft 21 of the X-axial grid wheel, and the second end 92 contacts against the second prop 8 to generate a torsional force for urging the shaft 21 toward the ball 6, as shown in FIG. 2. Similarly, the first end 91 of the other torsional spring 9 urges against the shaft 31 of the Y-axial grid wheel 31, and the second end 92 contacts against the second prop 8 to generate a torsional force for urging the shaft 31 toward the ball 6.

The X-axial receiving means 2 includes a first X-axial fastener 22 and a second X-axial fastener 23 for receiving the shaft 21 of X-axial grid wheel therebetween. The first X-axial fastener 22 has a hole 221 for receiving therein one end of the shaft 21. The second X-axial fastener 23 has a slot 231 for receiving therein the other end 211 of the shaft 21. The end 211 is moveable in slot 231. Similarly, the Y-axial receiving means 3 includes a first Y-axial fastener 32 and a second X-axial fastener 33 for receiving the shaft 31 of the Y-axial grid wheel therebetween. The first Y-axial fastener 32 has a hole 321 for receiving therein one end of the shaft 31. The second Y-axial fastener 33 has a slot 331 for receiving therein the other end 311 of the shaft 31. The end 311 is movable in slot 331.

Figure 3:
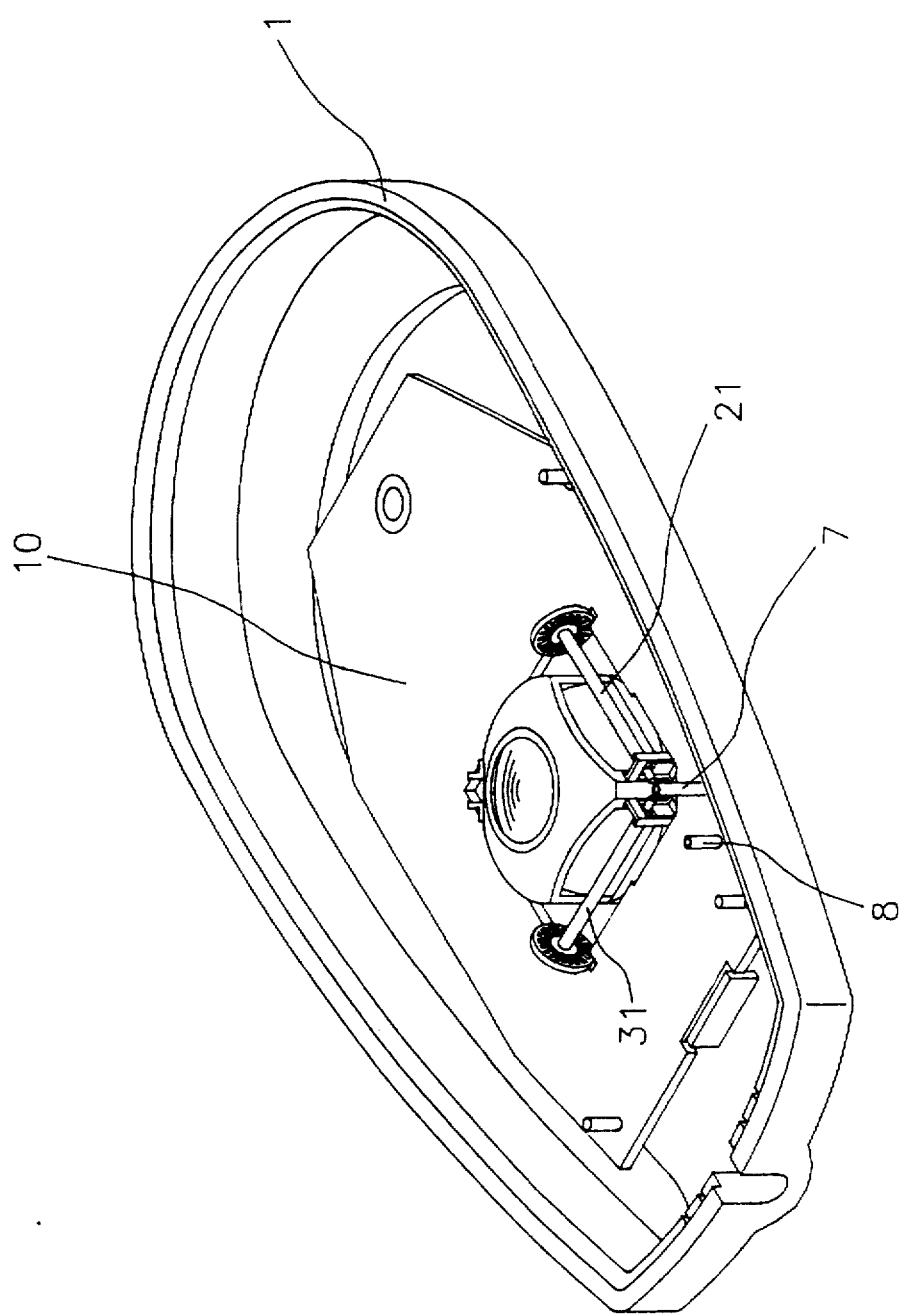
FIG. 3 is a schematic illustration of an assembled mouse structure according to FIG. 1.

Referring to FIG. 3, the torsional springs 9 are compressed and fixed or limited under a circuit board 10, except the portions contacting against the shafts 21 and 31. The circuit board 10 has through holes 101 and 102 for penetrating therethrough the first prop 7 and the second prop 8 respectively so that the circuit board 10 can be fixed.

When the ball rolls, the torsional springs 9 sleeving around the first prop 7 are pressed by the second prop 8 and the shafts 21 and 31, thus generating torsional forces that urging against the shafts 21 and 31. The ends 211 and 311 in the slots 231 and 331, respectively are then urged toward ball 6. Thereby, the shafts 21 and 31 can be urged to contact the ball 6 properly. Thus, the probability of signal-detection missing due to contact failure is reduced.

Furthermore, instead of urging the ball directly, the torsional springs of the present invention urge the shafts 21 and 31 to ensure their contacts with the ball. That is, there will be no need of choosing specific torsional springs generating accurate torsional forces while using a relatively light ball.

While the invention has been described in terms of what are presently considered to be the most practical and preferred embodiments, it is to be understood that the invention need not be limited to the disclosed embodiment. On the country, it is intended to cover various modifications and similar arrangements included within the spirit and scope of the appended claims which are to be accorded with the broadest interpretation so as to encompass all such modifications and similar structures.

What is claimed is:

1. A mouse structure comprising:
    a shell adapted to receive therein a ball;
    a receiving means for receiving a photo interrupting device in said shell; and
    an urging means urging said photo interrupting device to make contact against said ball, wherein said photo interrupting device includes an X-axial grid wheel and a Y-axial grid wheel, said receiving means includes an X-axial receiving means mounted on said shell for receiving a shaft of said X-axial grid wheel, and a Y-axial receiving means mounted on said shell for receiving a shaft of said Y-axial grid wheel and said urging means includes:
    a first prop extending upward from a bottom of said shell;
    a second prop extending upward from said bottom of said shell;
    a first torsional spring coaxially sleeved on said first prop and having a first end urging against said shaft of said X-axial grid wheel, and a second end contacting against said second prop; and
    a second torsional spring coaxially sleeved on said first prop and having a first end urging against said shaft of said Y-axial grid wheel, and second end contacting against said second prop.

2. A mouse structure according to claim 1, further comprising a Z-axial fixing means mounted in said shell.

3. A mouse structure according to claim 2, further comprising a ball mask mounted among said X-axial receiving means, said Y-axial receiving means and said Z-axial fixing means for receiving said ball therein.

4. A mouse structure according to claim 3 wherein said X-axial receiving means includes:
    a first X-axial fastener having a hole for receiving a first end of said shaft of said X-axial grid wheel; and
    a second X-axial fastener having a slot for receiving a second end of said shaft of said X-axial grid wheel, wherein said second end is movable in said slot; and
    said Y-axial receiving means includes:
    a first Y-axial fastener having a hole for receiving a first end of said shaft of said Y-axial grid wheel; and
    a second Y-axial fastener having a slot for receiving a second end of said shaft of said Y-axial grid wheel, wherein said second end of said shaft is movable in said slot of said second X-axial fastener.

5. A mouse structure according to claim 4 wherein said first X-axial fastener, said first Y-axial fastener and said Z-axial fixing means are integrally formed with said ball mask.

6. A mouse structure according to claim 5 wherein said first X-axial fastener, said first Y-axial fastener, said Z-axial fixing means and said ball mask are integrally formed with said shell.

7. A mouse structure according to claim 4 wherein said second X-axial fastener is integrally formed with said shell.

8. A mouse structure according to claim 4 wherein said second Y-axial fastener is integrally formed with said shell.

9. A mouse structure according to claim 1 wherein said first prop is integrally formed with said shell.

10. A mouse structure according to claim 1 wherein said second prop is integrally formed with said shell.

11. A mouse structure according to claim 1 further including a circuit board for pressing and fixing said first and second torsional springs.

12. A mouse structure according to claim 11 wherein said circuit board has a plurality of through holes for passing therethrough said first and said second props so that said first and second torsional springs can be pressed and fixed under said circuit board.

* * * * *